United States Patent [19]

De Vos et al.

[11] Patent Number: 5,687,557
[45] Date of Patent: Nov. 18, 1997

[54] OPEN STEEL CORD STRUCTURE

[75] Inventors: Xavier De Vos, Oudenaarde; Frans Van Giel, Gullegem, both of Belgium

[73] Assignee: N.V. Bekaert S.A., Zwevegen, Belgium

[21] Appl. No.: 741,626

[22] Filed: Oct. 28, 1996

Related U.S. Application Data

[63] Continuation of Ser. No. 348,228, Nov. 28, 1994, abandoned.

[30] Foreign Application Priority Data

| Dec. 15, 1993 | [EP] | European Pat. Off. | 93203523 |
| Mar. 8, 1994 | [EP] | European Pat. Off. | 94200584 |
| May 19, 1994 | [EP] | European Pat. Off. | 94201415 |

[51] Int. Cl.$^6$ ................ D02G 3/02; D02G 3/36
[52] U.S. Cl. ................ 57/902; 57/200; 57/212; 57/213; 57/214; 57/218
[58] Field of Search ................ 57/200, 212, 213, 57/214, 217, 218, 221, 223, 902

[56] References Cited

U.S. PATENT DOCUMENTS

| 1,615,790 | 1/1927 | Forbes et al. | 57/200 |
| 2,620,618 | 12/1952 | Chamoux | 57/212 |
| 3,240,570 | 3/1966 | Grimes et al. | 57/217 |
| 3,291,898 | 12/1966 | Sandell | 57/213 |
| 3,413,792 | 12/1968 | Werdanberg | 57/212 |
| 4,258,543 | 3/1981 | Canevari et al. | 57/212 |
| 4,399,853 | 8/1983 | Morimoto et al. | 152/359 |
| 4,408,444 | 10/1983 | Ballievier | 57/237 |
| 4,439,256 | 3/1984 | Meserve | 57/217 |
| 4,572,264 | 2/1986 | Umezawa et al. | 57/218 |
| 4,947,636 | 8/1990 | Sinopoli | 57/218 |
| 5,020,312 | 6/1991 | Watakabe | 57/200 |
| 5,319,915 | 6/1994 | Kobayashi et al. | 57/200 |
| 5,461,850 | 10/1995 | Bruyneel et al. | 57/212 |

FOREIGN PATENT DOCUMENTS

| 363893 | 4/1990 | European Pat. Off. . | |
| 462716 | 12/1991 | European Pat. Off. . | |
| 496884 | 4/1930 | Germany | 57/212 |
| 63-110002 | 5/1988 | Japan . | |
| 64-40687 | 2/1989 | Japan | 57/212 |
| 107654 | 7/1917 | United Kingdom | 57/200 |
| 126011 | 5/1919 | United Kingdom | 57/212 |
| 1000823 | 8/1965 | United Kingdom . | |

*Primary Examiner*—William Stryjewski
*Attorney, Agent, or Firm*—Foley & Lardner

[57] ABSTRACT

A steel cord (114) comprises strength elements (100, 132) and having a length, a longitudinal central axis (112) and a cord pitch. At least one of the elements (100) has a projection on a plane YZ perpendicular to the longitudinal central axis (112). This projection takes the form of a curve with a radius of curvature which alternates between a maximum and a minimum. The curve further has a center of curvature. The radius of curvature and the center of curvature lie inside the curve so that a convex curve is obtained. The cord (114) is further characterized by one or both of following features:

(i) the distance between two minimum radii of curvature of said curve measured along the longitudinal central axis (112) is different from half the cord pitch; or (ii) if all of said elements (100) provide a convex curve, at least one of said convex curves substantially differs from another convex curve.

20 Claims, 8 Drawing Sheets

OPEN STEEL CORD STRUCTURE

This is a continuation of application Ser. No. 08/348,228, filed Nov. 28, 1994, now abandoned.

FIELD OF THE INVENTION

The present invention relates to a steel cord and to a steel cord fabric for the reinforcement of elastomeric products such as rubber tires, conveyor belts, timing belts of polyurethane or of rubber, hoses, mandrels etc. The invention also relates to a process for manufacturing a steel cord for the reinforcement of rubber products and to a device for deforming a strength element of a steel cord.

BACKGROUND OF THE INVENTION

One of the major requirements put upon steel cords is full penetration of the elastomer such as rubber. This means that rubber must be able to penetrate into the cord between the composing elements and fill all possible interstices in order to reduce fretting and tensions between the elements and to avoid moisture from travelling along the cord, which would cause a lot of corrosion and which would considerably reduce the life of the cord and the rubber product.

The prior art has already provided some solutions which result in cords having rubber penetration. In patent documents U.S. Pat. Nos. 4 258 543 and 4 399 853 the solution consists of mechanically preforming the composing steel filaments of the steel cord beyond their elastical limit in such a way that the resulting steel cord takes an open form: due to the plastical deformation of the steel filaments such steel cords have 'macro-gaps' along their length which ensure rubber to penetrate into the cord. Such steel cords, however, have also an important disadvantage: in order to ensure a complete rubber penetration a large degree of plastical deformation and hence a large degree of openness is required. This leads to steel cords having too great a cord diameter and having too high a part load elongation (PLE). This may cause constructional instabilities in the twisted cord. When embedded in the breaker layer of a tire, such steel cords can have a bad influence on the steering properties and on the durability of the tire.

Prior art document EP-A-O 462 716 has provided a solution to the above problem of constructional instability. It discloses a steel cord having steel filaments which have been deformed in such a way that they take a helicoidal form with a helicoidal pitch which is smaller than the pitch of the steel cord and with a helicoidal diameter which is somewhat greater than the filament diameter. Due to the fact that the helicoidal pitch of this helicoidally deformed filament is smaller than the twist pitch of the steel cord more than one 'micro-gap' has been created per twist pitch. The term micro-gap is here used in order to make a distinction between the above-mentioned term macro-gaps. Micro-gaps are smaller in size but are more in quantity than the above macro-gaps. The sizes of micro-gaps are substantially smaller than the twist pitch of the steel cord. Due to these micro-gaps rubber is still able to penetrate completely into the steel cord without such steel cord having the disadvantage of a cord diameter which is too great and a part load elongation which is too great. The helicoidal filaments, however, are obtained by means of externally driven deformation pins which must rotate at a speed which is higher than twice the rotation speed of a double-twister which twists the steel cord. This is a rather energy-consuming and expensive way of manufacturing.

Yet another prior art document U.S. Pat. No. 5 020 312 discloses another way of deforming some or all of the steel filaments composing the steel cord in order to obtain a steel cord with full rubber penetration. Some or all of the steel filaments pass between the tooth surfaces of a pair of gear-like elements so that they obtain a zig-zagging shape. The pitches between two teeth of these gear-like elements can be chosen so that here again more than one micro-gap between the steel filaments can be obtained per twist pitch of the steel cord. As a consequence, full rubber penetration is again guaranteed without having the disadvantage of a relatively great part load elongation. The two gear-like elements are not driven by means of an external force but are driven by the steel filaments themselves. So this process is not energy-consuming and is not expensive. This embodiment, however, has the disadvantage that the gear-like elements may roll the filaments to some extent, which may either cause damage to the steel filaments, and especially to the thin coating layer (conveniently brass or zinc with a thickness which is much less than 1 micrometer), or may lead to a lot of wear on the gear-like elements themselves, or both. Damage caused to coated steel filaments can considerably decrease the fatigue resistance and the adhesion strength of these steel filaments.

SUMMARY OF THE INVENTION

It is an object of the present invention to provide for a steel cord which does not have the disadvantages of the prior art. It is a further object of the present invention to provide for a steel cord with full rubber penetration, with a low PLE, which is not expensive to manufacture and which has no damage to its composing steel elements. It is yet another object of the present invention to provide for a steel cord with an increased resistance against repeated bendings and an increased resistance against repeated tensile loads.

According to a first aspect of the present invention, there is provided for a steel cord comprising at least one strength element and having a longitudinal central axis. The elements are each twisted with a twist pitch into the cord and have a projection on a plane perpendicular to the longitudinal axis. These projections take the form of curves. At least one of these curves is a convex curve with a radius of curvature which alternates between a maximum and a minimum. The cord is further characterized by one or both of following features:

(i) the distance between two minimum radii of curvature of said convex curve measured along the longitudinal central axis is different from half the pitch of the element which provides the convex curve; or (ii) at least one of the curves is substantially different from another of the curves.

The terms 'steel cord' do not mean that all the composing elements need to be steel elements but mean that the majority of the composing elements are steel elements. Other elements of e.g. nylon or aramide may also be present as strength element or as filling element in the cord. The term 'elements' both refers to single filaments and to strands comprising a plurality of single steel filaments. There is no particular limit as to the specific form of the elements. Conveniently, the elements have a substantially circular cross-section, but elements with a flat, rectangular or oval cross-section are not excluded. The terms 'strength element' refer to an element (filament or strand) which substantially contributes to the total breaking load of the steel cord. The terms 'strength element' do not refer to a wrapping filament since this wrapping filament does not contribute substantially to the breaking load of a steel cord. In this sense, a distinction has been clearly made between the invention cord and the steel cord disclosed in JP-A-63-110 002 where the projection of only the wrapping filament forms a convex and polygonal curve on a plane perpendicular to the longitudinal axis of the cord. The term 'pitch' refer to the twisting pitch of the particular strength elements in the cord. A cord may have more than one twisting pitch: e.g. a cord with two layers around a core, one twist pitch for the core structure, one twist pitch for the intermediate layer and another twist pitch for the outer layer. The specific value of the twist pitches may vary from a few millimeter on, e.g. 5 mm to an infinite value. In this last case the relating strength elements are not twisted. In case of only one strength element in the cord, the pitch has also an infinite value. Feature (ii), a substantially different curve, means that or the amplitude, or the phase, or both of this curve are substantially different from the amplitude or the phase of the other curves.

Features (i) and (ii) clearly distinguish the invention cord over prior art cord as disclosed in EP-A-0 363 893. In this prior art cord all the three to six steel filaments form an convex and elliptical curve on a plane perpendicular to the longitudinal axis of the cord. The distance between the two maximum radii of curvature of this ellips measured along the longitudinal axis of the cord is equal to half the twist pitch of the cord and the projection of all the three to six filaments substantially provides the same ellips. This means that all filaments run parallel to one another and that, as a consequence, no micro-gaps are formed.

Preferably, for an invention cord the distance between two minimum radii of curvature is smaller than half the pitch of the element which provides the convex curve. This is in order to avoid a wavy cord with too high an arc height.

Usually, the convex curve described by the projection of at least one of the strength elements on a plane perpendicular to the longitudinal axis approximately takes the form of a polygon with rounded edges, over a length equal to the twist pitch of the relevant element. This polygon can be a triangle, a quadrangle, a pentagon, a hexagon, etc.

All the composing strength elements of the cord or only a subgroup of them may provide said convex curve.

In a first embodiment of the invention cord, the strength element is a steel strand which comprises a plurality of single steel filaments. Examples of such cords are following multi-strand constructions:

3×3, which means three strands of each three filaments;
4×4, e.g. in a high-elongation (HE) version;
4×2, which means four strands of two filaments each, e.g. in an elongation (E) version;
4×(1+5), which means four strands, each strand comprising a core filament and five layer filaments;
7×3;
3×7, e.g. in a high-elongation (HE) version;
7×4;
4×7, e.g. in a high-elongation (HE) version;
7×19;
19+7×7, which means a core strand of 19 filaments and seven layer strands of seven filaments each;
7×31;
1×3+5×7.

According to the present invention, the projection of the strand as a whole on a plane perpendicular to the longitudinal axis of the cord describes a convex curve in order to allow for rubber penetration between the strands. Each strand however, may comprise one or more filaments the projection of which, in their turn, also describes a convex curve in order to allow for rubber penetration between the individual filaments within a strand.

In a second embodiment of the invention cord, the strength element is an individual steel filament. Examples of such invention cords are:

1×n (where n is the number of filaments which is greater or equal to one and smaller or equal to five);
1+m (where 1 is the number of core filaments and m the number of layer filaments around the core, e.g. 1+6, 3+9, 3+6, 3+7, 2+7, 2+8, 3+8);
1+m+n (where 1 is the number of core filaments, m the number of filaments in an intermediate layer around the core and n the number of filaments in an outer layer, e.g. 1+6+12, 3+9+15, 3+8+13, 1+4+10);
1×n CC (a so-called compact ford where all the n filaments have the same twist pitch and the same twist direction, n varies between six and twenty-seven).

If the invention cord is a 1×2, a 1×3, a 1×4 or a 1×5-cord, each of the individual steel filaments has a PLE at a tensile tension of 50 Newton which differs no more than 0.20% and preferably no more than 0.10% (absolute values and not relative values) from the PLE of each of the other steel filaments, regardless of the fact whether or not the projection of a steel filament provides a convex curve. This feature, namely a cord only composed of filaments with PLE in a small range, is advantageous for the construction stability of the cord. The EP-A0 462 716-cord does not have that feature since the helicoidal filaments have a PLE which is much greater than the non-helicoidal filaments and since not all filaments are helicoidal filaments. The U.S. Pat. No. 5 020 312-cord only has that feature if all composing filaments have been deformed in the zig-zagging shape. This is with respect to the PLE at filament level.

With respect to the PLE at cord level, a 1×2, a 1×3, a 1×4 or a 1×5 invention cord preferably have a (cord-)PLE which is lower than 0.30%, and preferably lower than 0.25%, e.g. lower than 0.20%. As explained hereabove, such a low PLE at cord level, also promotes the constructional stability of a cord.

For both the cord level and the filament level, the PLE is defined as the increase in length of a test specimen (cord or filament), which results from subjecting it to a defined force (usually 50 Newton) from a defined pre-tension (usually 2.5 Newton) onwards. The elongation is expressed as a percentage of the initial length of the specimen.

If the invention cord is a 1×n CC compact cord, its transversal cross-section shows a compact configuration of the cross-sectional surfaces of the individual filaments. According to this cross-section, the cord can be divided into combinations of three filaments each, where these three filaments form a 'triangle' of neighbouring filaments enclosing a central void. If the three filaments of each such combination mutually contact one another, rubber cannot penetrate into the central void and moisture may travel in the void along the whole cord. Therefore, according to a particular embodiment of the invention cord, at least one of the filaments of every such a combination has a projection which provides a convex curve in order to create micro-gaps between the three filaments and to allow rubber to penetrate to the central void during vulcanization.

According to a second aspect of the present invention, there is provided for a fabric comprising a weft and a warp. The weft or the warp or both are at least partially formed by steel cords according to the first aspect of the present invention.

According to a third aspect of the present invention, there is provided for a process for manufacturing a steel cord having a a longitudinal axis and comprising strength elements each twisted with a twist pitch into said cord. The invention process comprises as steps:

subjecting at least one of the elements to a bending operation thereby giving to the at least one element a particular curve having a radius of curvature which alternates between a maximum and a minimum;

bringing the at least one element together with the other elements to form said steel cord.

The process is further characterized by one or both of following features:

(i) the distance between two minimum radii of curvature of the curve measured along the longitudinal central axis is different from half the pitch of the element which provides for said particular curve; or (ii) the particular curve being substantially different from the curves described by the other elements.

According to a fourth aspect of the present invention, there is provided for a device for deforming a strength element of a steel cord. The invention device comprises a body having a central axis and a circumferential surface. The body is rotatable around its central axis when a strength element is drawn over an angle of at least 90° over its circumferential surface. The circumferential surface has a radius of curvature which alternates between a maximum and a minimum so as to give to the strength element which passes over it a curve with a radius of curvature which alternates between a maximum and a minimum.

The invention steel cord can be manufactured in basically two ways:

1) the invention device which gives the convex curve to the projection of the element, does not rotate with the twisting apparatus (although it rotates around its own central axis), and the twisting apparatus is a single-twister or a double-twister which subjects the individual steel elements to a rotation around their longitudinal axes;

2) the invention device which gives the convex curve to the projection the element, rotates with the twisting apparatus (and also around its own central axis) and the twisting apparatus does not subject the individual steel elements to a rotation around their longitudinal axes; an example of such a twisting apparatus is a tubular strand machine.

In both cases a plastical compression zone and a plastical tension zone may be created in a cross-section of an element at least at the smallest radius of curvature. In the first case, the compression zone and the tension zone remain stationary with respect to the steel element. The steel filament is rotated around its central axis. In the second case, the steel element as such is not rotated around its central axis, but the compression zone and the tension zone rotate around the steel element along the length of the steel element.

BRIEF DESCRIPTION OF THE DRAWINGS

The invention will be now explained into more detail with reference to the accompanying drawings wherein.

DESCRIPTION OF A PREFERRED EMBODIMENT OF THE INVENTION

Figure 1:
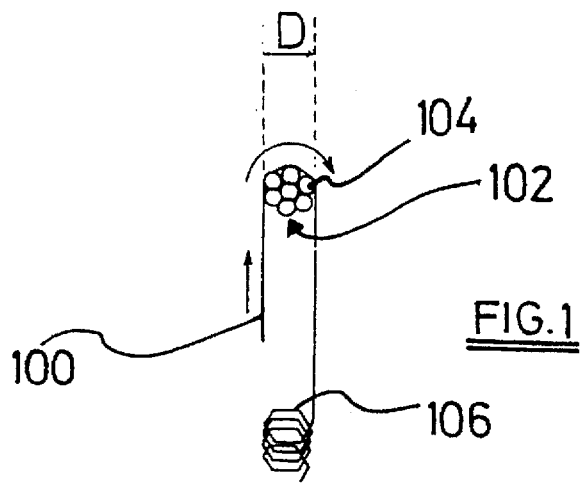
FIG. 1 shows the step of subjecting at least one of the elements of an invention cord to a bending operation according to an invention process.

Referring to FIG. 1, a hard-drawn steel filament 100 with a diameter of 0.28 mm passes over an invention deforming device 102. This deforming device 102 comprises a number of deforming pins 104 which are fixedly connected to the deforming device 102. The deforming device 102 is characterized, amongst others, by a diameter D of a circle circumscribing all the deforming pins 104 and by the number of the deforming pins 104 and by the diameter of the pins 104. The diameter D determines the PLE. The diameter of the deforming pins 104 is smaller than 5 mm for a filament 100 with a diameter of 0.28 mm. Deforming pins having a diameter greater than 5 mm would result in too small a tensile tension needed to completely close the cord. The diameter of the deforming pins is preferably greater than or equal to 2 mm for a filament diameter of 0.28 mm. Deforming pins with a diameter smaller than 2 mm would decrease the tensile strength of the steel filament too much because of too high a local deformation.

More generally, the suitable range of the diameter of the deforming pins depends upon the tensile strength and upon the diameter of the element to be deformed. The higher the tensile strength of the element the smaller the diameter of the deforming pins, and vice versa. The smaller the diameter of the element the smaller the possible diameter of the deforming pins, and vice versa. The diameter of the deforming pin determines the minimum spatial (three-dimensional) radius of curvature of the deformed filament. This minimum spatial radius of curvature is greater than the diameter of the deforming pin since some stretching occurs during the twisting process after the deformation. The maximum spatial radius of curvature can take almost an infinite value since the deformation between the deforming pins is not that great. It is hereby understood that the radii of curvature mentioned in the claims are two-dimensional or planar radii of curvature in the YZ-plane and that their values are consequently much smaller.

The entire deforming device 102 is rotatably mounted but is not driven by an external energy source. The deforming device 102 is driven by the filament 100 itself. No slip occurs between the filament 100 and the deforming device 102 so that the wear caused to the deforming device is limited and so that no damage is caused to the steel filament 100. This is an advantage with respect to the prior art cord as disclosed in U.S. Pat. No. 5 020 312. As a result of passing over the particular deforming device 102, the steel filament 100 is bent in a special way: the radius of curvature alternates between a minimum at the level of the preforming pins 104 and a maximum in between the preforming pins 104. Removing the tension from the thus bent steel filament 100 no longer results in a so-called 'cast' of subsequent substantially circular forms but in a cast 106 of subsequent approximately polygonal forms with rounded edges. The rounded edges of the polygon correspond to the minimum radii of curvature whereas the sides of the polygon correspond to the maximum radii of curvature. The minimum radius of curvature is determined by the diameter of the deforming pins 104 and the length of the sides of the polygon is determined by the distance between the deforming pins 104.

Figure 2A:
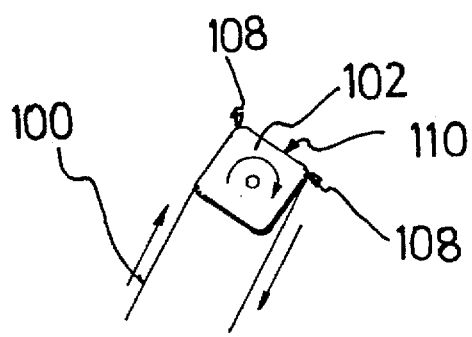
FIG. 2a and FIG. 2b schematically show other embodiments for subjecting at least one of the elements of an invention cord to a bending operation according to an invention process.
Figure 2B:
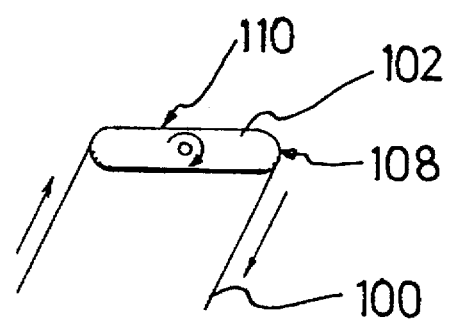

Other deforming devices which differ in structure from the disclosed deforming device of FIG. 1 but which result in similarly deformed steel filaments may be conceived: for example, a rotatable single deforming pin 102 made of hard metal and having a substantially polygonal cross-sectional shape with rounded edges 108 and sides 110 (FIG. 2a) or an elongated cross-sectional shape (FIG. 2b) can also deform the steel filament in the way of the invention.

Figure 3A:
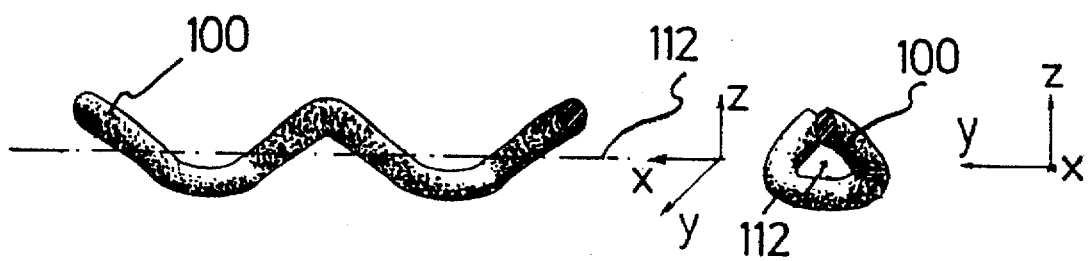
FIG. 3a and FIG. 3b show respectively a longitudinal view and a frontal view of a strength element of an invention cord which has been subjected to the invention process.
Figure 3B:
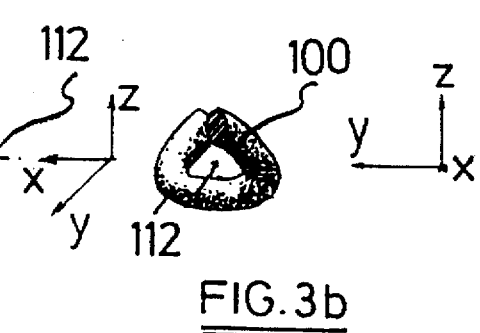

The thus deformed steel filament 100 is further twisted by means of a double-twister with other steel filaments which may have been deformed in the same way or not, into a steel cord. This results in a steel filament 100 which has been shown in FIG. 3a (longitudinal view) and FIG. 3b (front view). The X-axis is parallel to the longitudinal and central axis 112, while the Y-axis and the Z-axis lie in a plane perpendicular to the central axis 112. Note that FIG. 3b shows also an almost polygonal form with rounded edges rather than the usual circular form (it is hereby understood that the scales in Y- and Z-direction are much larger than the scale in X-direction). The radius of curvature of this filament 100 alternates between two extremes: a minimum at the points where the highest bending has been given and a maximum at the points where the smallest bending has been given. As a consequence of the rotating of the filament 100 around its own longitudinal axis, the radius of curvature of this filament always points in the direction of a central axis 112 of the cord and this along the length of the cord. This means that the polygon has a convex form. In other words, after deformation, after having been twisted and after removing all external tensions, the zone of plastical tension of the steel filament always lies radially inward while the zone of plastical compression lies radially outward. This is a fundamental difference with a filament which has been subjected to a deformation treatment between two gear-like elements, as disclosed in U.S. Pat. No. 5 020 312: the zig-zagging shape of the steel filaments has a radius of bending which continuously changes of direction. This results in a front view (YZ-plane) which shows convex and concave forms. Generally and theoretically, with a distance between two minimum radii of curvature which is equal to one third of the twist pitch a triangular is obtained, with a distance between two minimum radii of curvature which is equal to one quarter of the twist pitch a quadrangular is obtained, etc . . .

Figure 4:
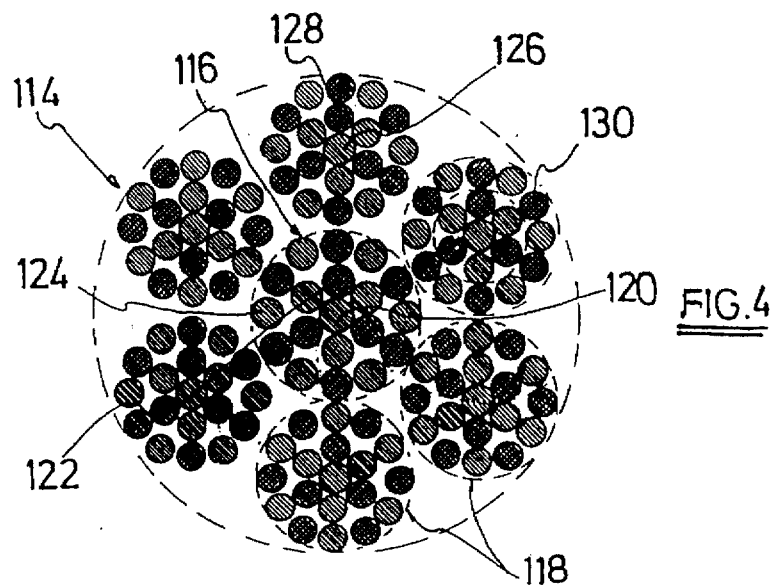
FIG. 4 shows a transversal cross-section of an invention steel cord comprising steel strands as strength elements.

FIG. 4 shows a transversal cross-section of a 7×19 multi-strand steel cord construction adapted—amongst other applications—for the reinforcement of conveyor belts. The steel cord 114 comprises a core strand 116 which is surrounded by six layer strands 118. The core strand 116 consists of a core filament 120, six intermediate layer filaments 122 surrounding the core filament 120 and twelve outer layer filaments 124 surrounding the intermediate layer filaments 122. Each layer strand 118 consists of a core filament 126, six intermediate layer filaments 128 surrounding the core filament 126 and twelve outer layer filaments 130 surrounding the intermediate layer filaments 128. In order to obtain full rubber penetration between the strands 116 and 118, one or more strands as a whole can be subjected to the deforming operation which has been described above with respect to a single steel filament 100. In this way the deformed strands take the particular convex curve in a YZ-plane and create a plurality of micro-gaps between them and the other strands in order to allow the rubber to penetrate.

In this FIG. 4, and also in FIGS. 5, 7a, 7b, 8a, 8b, 8c, 9 and 19, filaments which have been subjected to the deformation process as described in FIG. 1 and which provide the particular convex curve in a YZ-plane, have been cross-hatched and will be designated as 'specially deformed filaments', while the other filaments have been hatched only in one direction.

Referring back to FIG. 4 alone, in order to obtain full rubber penetration in every strand 116, 118, following teaching according to the present invention can be applied: three of the six intermediate filaments 122, 128 are specially deformed filaments and alternate with other filaments in the intermediate layer of each strand 116, 118; six of the twelve outer layer filaments 124, 130 are specially deformed filaments and alternate with other filaments in the outer layer of each strand 116, 118.

Figure 5:
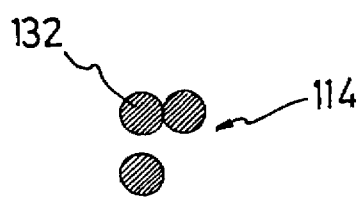
FIG. 5 shows a transversal cross-section of a 1×4 invention steel cord comprising steel filaments as strength elements.
Figure 19:
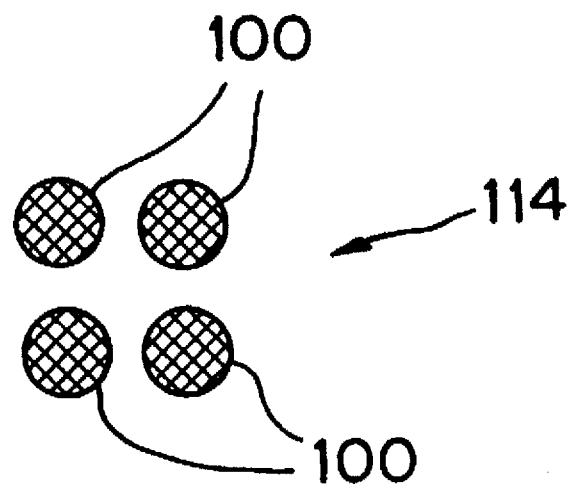
FIG. 19 shows a transversal cross-section of a cord according to the present invention where all of the strength elements are deformed.

FIG. 5 shows a transversal cross-section of a single-strand steel cord 114 according to the present invention. The invention steel cord 114 consists of a specially deformed filament 100 and of three 'normal' steel filaments 132. In order to have a constructionally stable steel cord 114 where all (four) filaments have the same length, the three 'normal' steel filaments 132 have also been plastically deformed (although not in the special way according to the invention). This is the reason why in FIG. 5 gaps are even present between the steel filaments 132 mutually. These gaps, which are in fact 'macro-gaps', are, however, kept between limits by subjecting the thus formed steel cord to a straightening operation. This straightening operation both reduces the PLE and improves the arc height of the steel cord. FIG. 19 shows the steel cord 114 similar to the cord 114 shown in FIG. 5 except that all of the filaments 100 are specially deformed.

Figure 6:
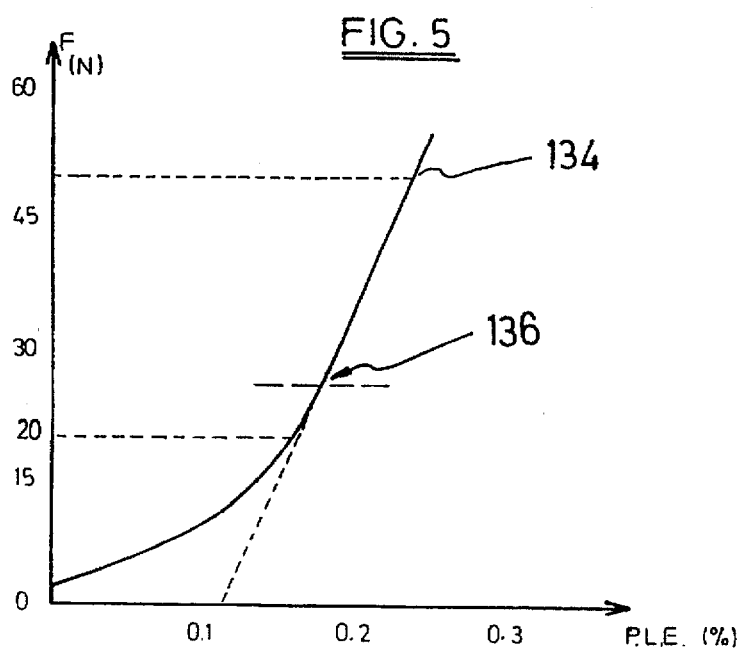
FIG. 6 shows a PLE-curve of a 1×4 invention steel cord.

FIG. 6 shows a particular PLE-curve 134 of a 1×4 invention cord. It is remarkable that the point 136 where a straight line leaves the upper part of the PLE-curve 134, lies above the pretension of 20 Newton. This means that the point 136 where individual filaments of the steel cord come together and where rubber penetration is no longer possible, lies above the pretension of 20 Newton which is normally used when embedding the steel cords in rubber. In other words, at a pretension of 20 Newton, rubber penetration is still guaranteed.

Figure 7A:
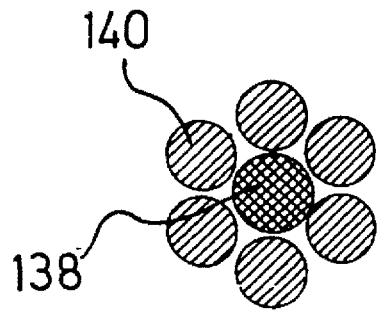
FIG. 7a, FIG. 7b, FIG. 8a, FIG. 8b, FIG. 8c and FIG. 9 show transversal cross-sections of invention steel cords.
Figure 7B:
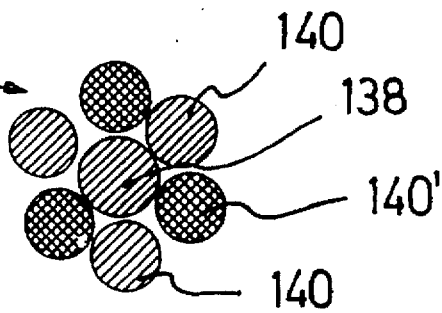

FIG. 7a and FIG. 7b show cross-sections of two embodiments of a 1+6-cord according to the present invention. The steel cord 114 comprises a core filament 138 and six layer filaments 140, 140' which surround the core filament 138. In the embodiment of FIG. 7a, only core filament 138 is a specially deformed filament, while the other filaments 140 have not been specially deformed. In the embodiment of FIG. 7b, three of the six layer filaments 140' are specially deformed filaments, while the core filament 138 and the other layer filaments 140 have not been specially deformed. Specially deformed filaments 140' alternate with normal filaments 140 in the layer.

Figure 8A:
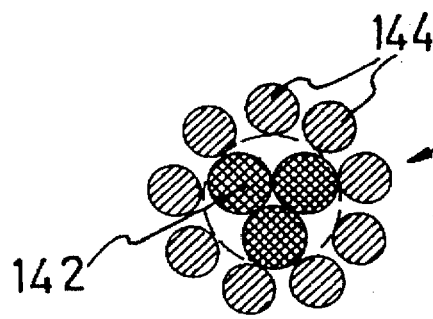

FIG. 8a shows the cross-section of a 3+9-cord twisted in SS or SZ but not in a compact version. The cord 114 comprises a core of three core filaments 142 surrounded by a layer of nine layer filaments 144. The three core filaments 142 are specially deformed steel filaments, the layer filaments 144 are normal filaments. In this way the central void between the three core filaments 142 is avoided and rubber can envelop every single filament 142, 144.

Figure 8B:
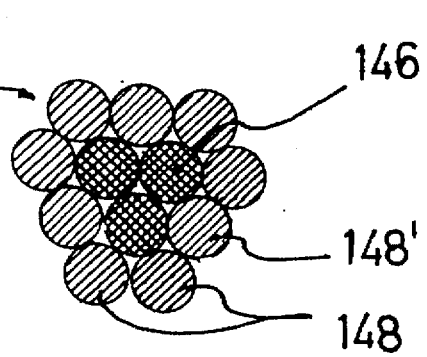
Figure 8C:
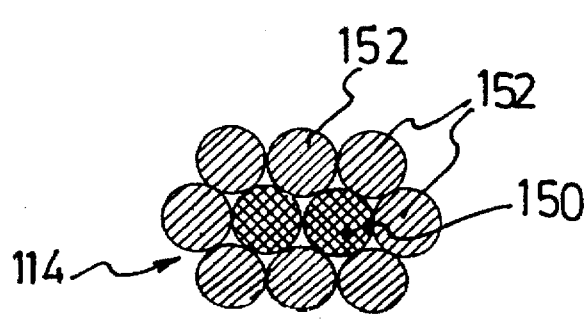

FIG. 8b shows the cross-section of a 1×12 CC-cord in a compact version and FIG. 8c shows the cross-section of a 1×10 CC-cord in a compact version. The core filaments 146, 150 may or may not have a larger diameter than the layer filaments 148, 152. The core filaments 146, 150 are specially deformed filaments, the other filaments are normal filaments. For every possible combination of three filaments which form a triangle of neighbouring filaments in a cross-section, at least one filament is a specially deformed filament so that central voids are avoided and rubber penetration is guaranteed.

Figure 9:
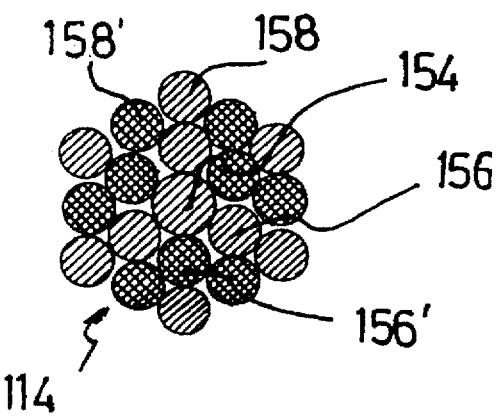

FIG. 9 shows the cross-section of a 1×19 CC-cord in a compact version. The core filament 154 may or may not have a larger diameter than the other filaments 156, 158. Three of the six intermediate layer filaments 156' are specially deformed filaments and alternate with normal filaments 156 in the intermediate layer. Six of the twelve outer filaments 158' are specially deformed filaments and alternate with normal filaments 158 in the outer layer.

The invention is not limited to the above explicitly disclosed cord examples but can be applied to all kinds of steel cord where rubber penetration may form a problem.

Figure 10:
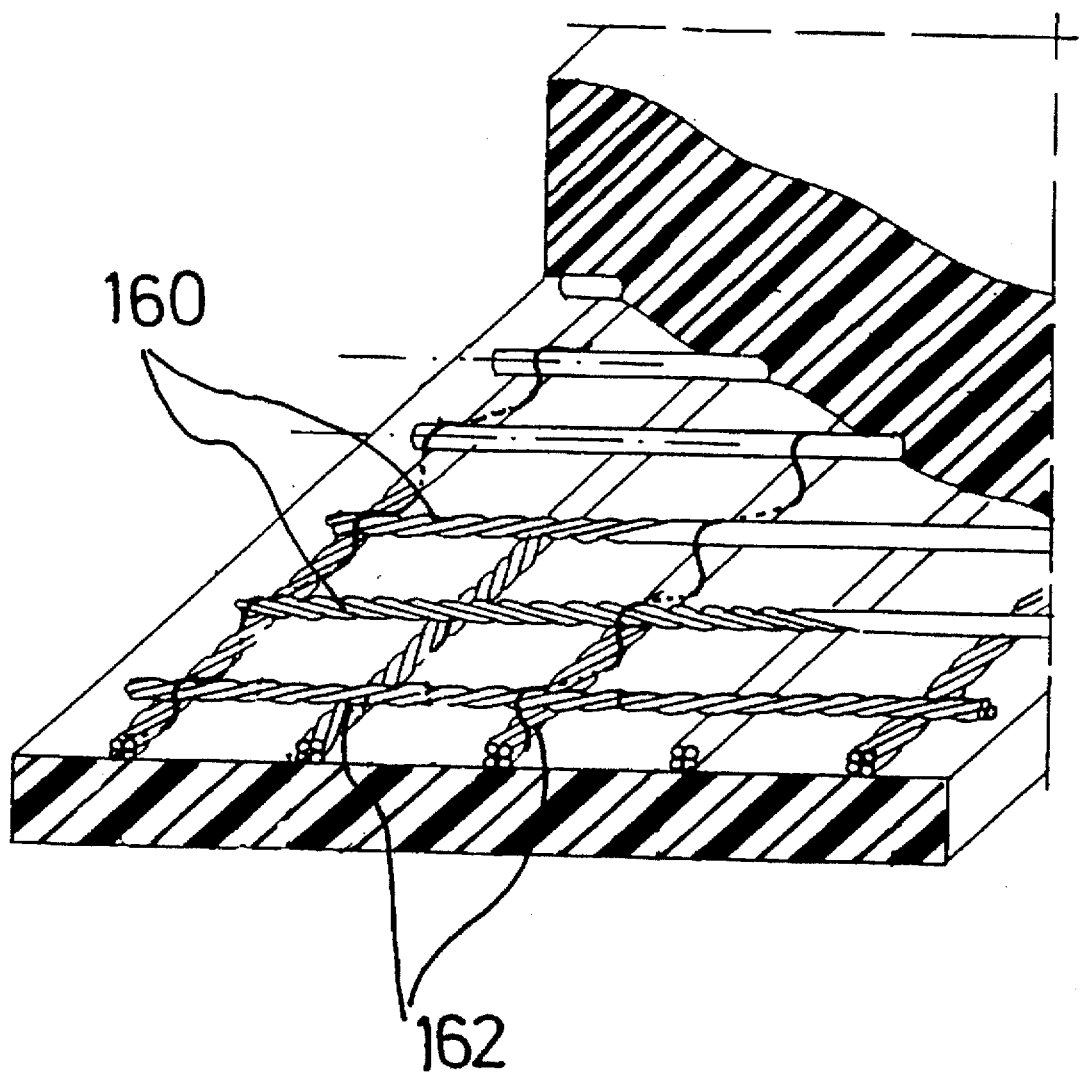
FIG. 10 shows a schematic drawing of an invention fabric.

With reference to FIG. 10, the invention cord can also be used as an element of a weave fabric, e.g. to reinforce conveyor belts. The weft elements 160 or the warp elements 162, or both, are steel cords which comprise specially deformed steel filaments.

TEST 1

Four steel cords according to the present invention have been made and tested:

no. 1: 4×0.28 cord with only one specially deformed filament;

no. 2: 4×0.28 cord with two specially deformed filaments;

no. 3: 4×0.28 cord with three specially deformed filaments;

no. 4: 4×0.28 cord with four specially deformed filaments.

Although it has been found that larger twist pitches are possible with these specially deformed filaments, all the above steel cords 1 to 4 have a pitch length of 12.5 mm.

The special deforming device 102 used in this test had six deforming pins 104 with a pin diameter of 2 mm each.

The table hereunder lists the obtained test results. For the rubber penetration test a sample cord length of 12.7 mm has been embedded under a pretension of 20 Newton in a small rubber beam which is subsequently put under pressure of 1 bar. The loss in pressure has been recorded. This loss in pressure indicates the degree of rubber penetration. No pressure loss means full rubber penetration.

TABLE 1

| | test results | | | |
|---|---|---|---|---|
| | invention steel cords | | | |
| | 1 | 2 | 3 | 4 |
| rubber penetration (% loss in pressure) | 0 | 0 | 0 | 0 |
| | 0 | 0 | 0 | 0 |
| | 0 | 0 | 0 | 0 |
| PLE (50 N) (%) | 0.230 | 0.223 | 0.244 | 0.229 |
| | 0.242 | 0.218 | 0.244 | 0.244 |
| | 0.236 | 0.223 | 0.242 | 0.240 |
| E-modulus (MPa) | 206571 | 210902 | 194463 | 194816 |
| | 227170 | 197466 | 210723 | 199752 |
| | 196534 | 211182 | 213430 | 205776 |

Rubber penetration is complete for all four embodiments despite the relatively low part load elongation PLE at 50 Newton: all PLE values remain under 0.25%.

TEST 2

In a second test two invention cords have been compared with prior art cords with respect to the resistance against repeated bendings and with respect to the resistance against repeated tensile loads.

Following cords have been tested:

1) 4×0.28 invention cord with four specially deformed filaments and twist pitch 16 mm 2) 4×0.28 invention cord with four specially deformed filaments and twist pitch 12.5 mm 3) 4×0.28 closed cord, i.e. with all filaments in contact with each other in a cross-section, twist pitch=12.5 mm;

4) 4×0.28 open cord, i.e. a cord according to U.S. Pat. No. 4 258 543, twist pitch=12.5 mm;

5) 4×0.28 cord with one one filament helicoidally preformed according to EP-A-O 462 716; pitch=12.5 mm;

6) 4×0.28 cord with one filament having a zig-zagging shape according to U.S. Pat. No. 5 020 312; pitch=12.5 mm;

7) 4×0.28 cord with four filaments having a zig-zagging shape according to U.S. Pat. No. 5 020 312; pitch=12.5 mm;

8) 2+2×0.28 cord according to U.S. Pat. No. 4 408 444; pitches: infinite value and 12.5 mm.

The resistance against repeated bendings is measured by subjecting a rubberized cord sample under a tensile tension of 1200 MPa to repeated bendings over a wheel with a diameter of 26 mm until fracture of the cord. This is carried out twice, once without pre-conditioning the test sample with water, and once with pre-conditioning the test sample with water. This pre-conditioning with water is done by connecting one side of the test sample where a length of the cord protrudes from the rubber to a water pipe under a water pressure of 1.5 bar and during a period of 5 minutes. The resistance against repeated tensile loads is measured by subjecting a rubberized cord sample to a tensile tension which periodically varies between of 880 MPa−X % of 880 MPa and 880 MPa+X % of 880 MPa. The starting amplitude X is 50%, which means 440 MPa. After 100000 periods the amplitude X is increase with 10% and so on until the cord breaks. This test has been carried out three times.

TABLE 2 test results.

| CORD | resistance against repeated bendings | | resistance against repeated tensile loads (X in %) |
|---|---|---|---|
| | dry | pre-conditioned with water (number of bendings) | |
| 1) | 128453 | 122203 | 80/90/100 |
| 2) | 112886 | 117414 | 80/80/90 |
| 3) | 94346 | 15635 | 80/90/80 |
| 4) | 43293 | 21922 | 70/70/80 |
| 5) | 50002 | 52080 | 70/90/80 |
| 6) | 54470 | 78743 | 60/70/70 |
| 7) | 22508 | 23089 | >50/50/50 |
| 8) | 98612 | 71250 | 80/80/80 |

The invention cords 1) and 2) are particularly characterized by a very high resistance against repeated bendings and by the fact that this high resistance does not decrease after preconditioning the rubberized cords with water. The resistance against repeated tensile loads of the invention cords 1) and 2) is higher or equal to the resistance of the prior art cords.

Figure 11A:
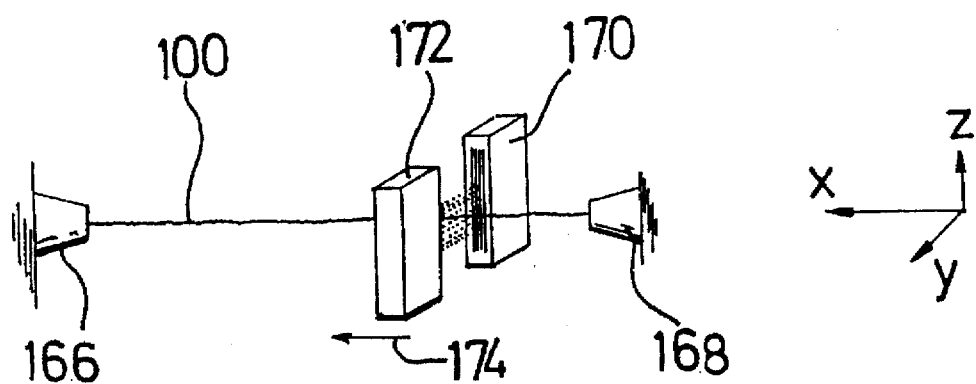
FIG. 11a and FIG. 11b show schematically how a measurement is carried out in order to distinguish prior art cords from invention cords.
Figure 11B:
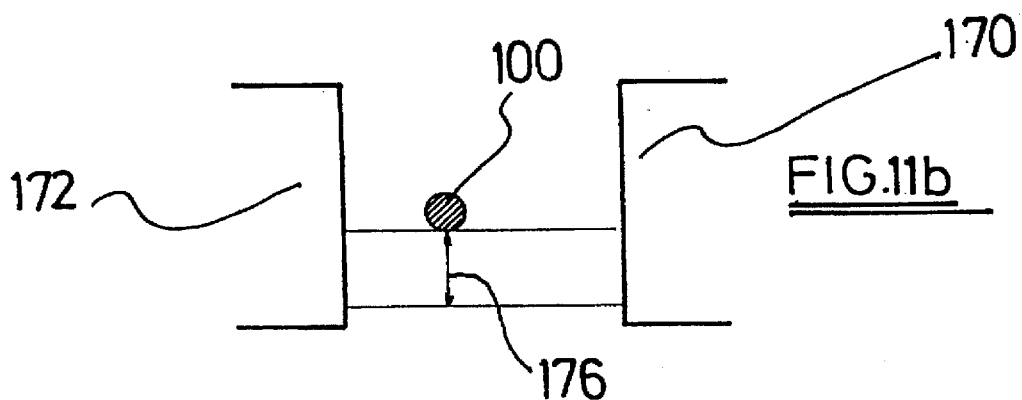

FIGS. 11a and 11b illustrate schematically the framing of a test equipment which is used in order to distinguish prior art cords from invention cords. To that purpose, a sample length of about 10 cm of a steel filament 100 is disentangled from a twisted steel cord without plastically deforming the steel filament 100. The sample steel filament 100 is mounted horizontally between two fixing points 166 and 168 under a slight tension just high enough to keep it horizontally and to avoid substantial deformation of the form of the filament at least in the middle part of the sample length. If the mounting is not exactly horizontal, later software correction is possible. The sample steel filament 100 is then scanned in the longitudinal X-direction 174 by means of a KEYENCE LS 3034 laser head which consists of a laser beam emitter 170 and a laser beam receiver 172. The laser head 170, 172 measures the distance 176 between a reference level and the lower side of the sample filament 100 (=distance Z). Processing of the measurement is done by means of a KEYENCE LS 3100 unit. After measuring the distance Z for the whole length, the sample filament is rotated over 90° and the distance Y is measured for the whole length. By means of a personal computer a YZ-curve is generated.

Figure 16:
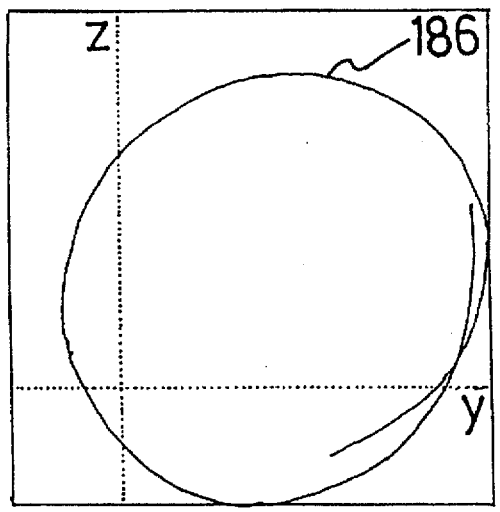
FIG. 16, FIG. 17 and FIG. 18 show YZ-curves of prior art cords.
Figure 17:
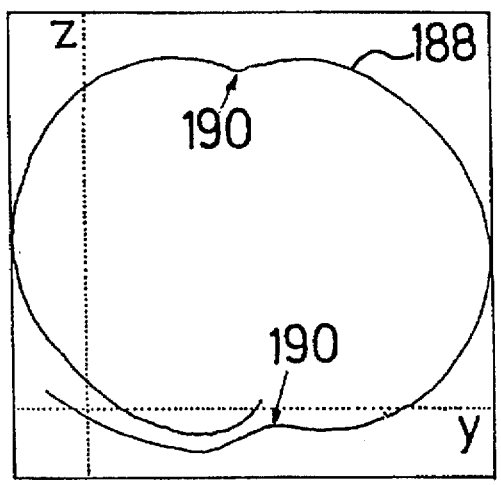
Figure 18:
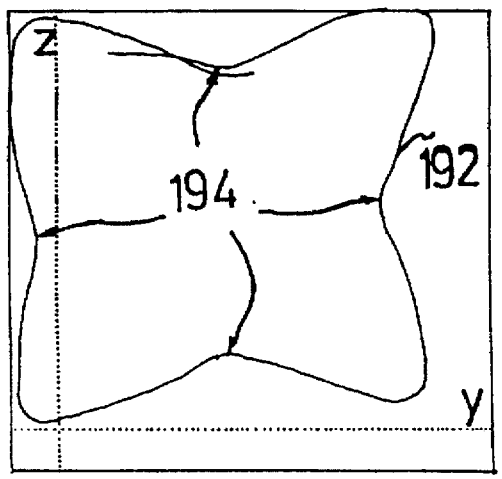

The above described distinguishing test has been carried out on seven 1×4×0.28-steel cords all having a twist pitch of 16 mm. Four of these steel cords are invention cords and their YZ-curves are shown in FIGS. 12 to 15 and three of these steel cords are prior art cords and their YZ-curves are shown in FIGS. 16 to 18.

Figure 12:
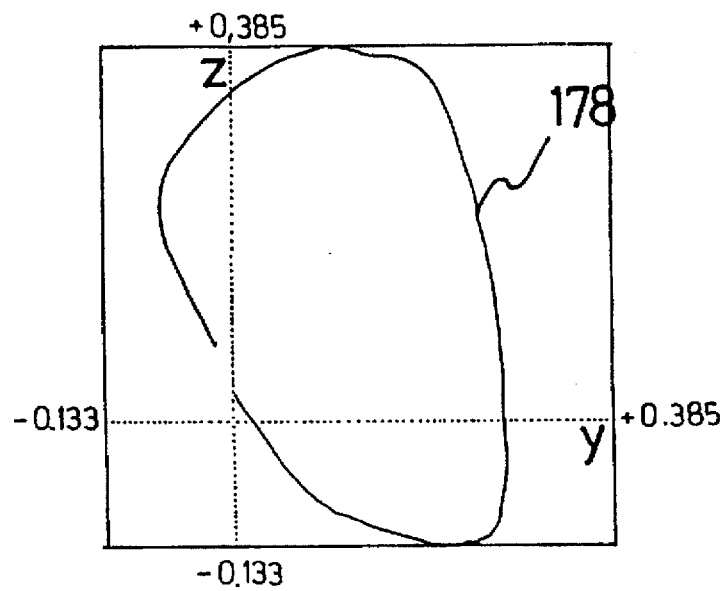
FIG. 12, FIG. 13, FIG. 14 and FIG. 15 show YZ-curves of invention cords.

FIG. 12 shows the YZ-curve of a specially deformed steel filament taken out of a 1×4×0.28 invention steel cord and this for only part of the distance between the two fixing points 166 and 168, namely for a length X of 17 mm. The maximum value in both the Y- and in the Z-direction is +0.385 mm and the minimum value in both the Y- and in the Z-direction is −0.133 mm. Diameter D of the preforming device 102 was 10 mm, the deforming device had six pins 104 with a pin diameter of 3 mm, and the distance between the pins 104 was 5 mm. Theoretically, the YZ-curve must show a polygonal form with 16 mm/5 mm=3.2 rounded edges per twist pitch of the cord. More generally, the twist pitch divided by the distance between the deforming pins determines the polygonal shape. The curve 178 which is depicted on FIG. 8 almost takes the form of a flattened triangular, so with three rounded edges. The flattening is a consequence of the straightening operation carried out on the cord after its formation and the three rounded edges substantially correspond to the theoretically predicted factor 3.2. the The curve is that of a convex polygon, without concave parts.

Figure 13:
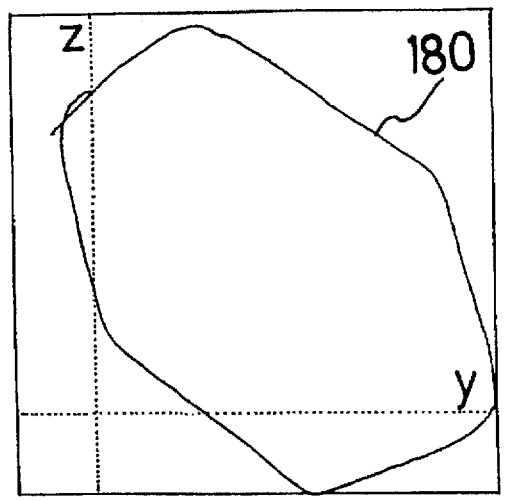

FIG. 13 shows the YZ-curve of a specially deformed steel filament taken out of a 1×4×0.28 invention steel cord and this for a length X of 16.9 mm. Diameter D of the preforming device 102 was 8 mm, the deforming device had nine pins 104 with a pin diameter of 2 mm, and the distance between the pins 104 was 2.5 mm. Theoretically, the YZ-curve must show a polygonal form with 16 mm/2.5 mm=6.4 rounded edges per twist pitch of the cord. The curve 180 which is depicted on FIG. 9 takes the form of a flattened hexagon, so with six rounded edges. The flattening is again a consequence of the straightening operation carried out on the cord after its formation and the six rounded edges substantially correspond to the theoretically predicted factor 6.4.

Figure 14:
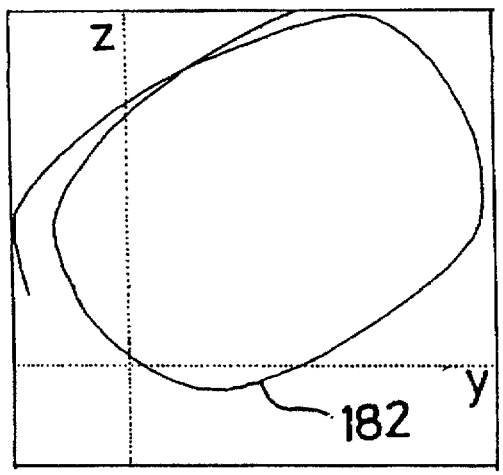
Figure 15:
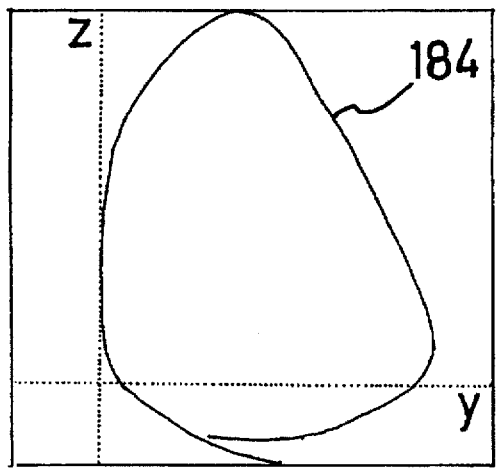

FIGS. 14 and 15 show other YZ-curves of specially deformed steel filaments taken out of invention steel cords.

All FIGS. 12 to 15 have in common that they show more or less flattened polygonal forms with rounded edges. Their form is, apart from measurement errors, always convex and never concave. This is a consequence of the special way of preforming according to the invention which results for each transversal cross-section in a tension zone which points to the central axis of the cord. Note that the polygon is not necessarily closed per twist pitch of the cord.

FIG. 16 shows a YZ-curve 186 of a prior art cord according to U.S. Pat. No. 4 258 543. Here the deformation device consists of only one cylindrical deformation device which gives to the filament a constant radius of curvature and the YZ-curve should be theoretically a circle. The form of curve 186 is very close to a circle.

FIG. 17 shows a YZ-curve 188 of a prior art cord according to EP-A-O 462 716 (helicoidal deformation). Curve 188 shows a number of concave parts 190. Finally, FIG. 18 shows a YZ-curve 192 of a prior art cord according to U.S. Pat. No. 5 020 312 (zigzagging shape). Here again, curve 192 shows a number of concave parts 194. The concave parts 190 and 194 are a consequence of the fact that the position of the zone of tension changes over the length of the filaments. At one point the tension zone is located radially inwardly and at another point the tension zone is located radially outwardly.

It goes without saying that the above-described invention is applicable to all kind of filaments suitable for elastomer reinforcement, independent of its exact diameter, its specific steel composition, its tensile strength or its particular coating.

In this respect, the steel filaments conveniently have a diameter ranging from 0.03 mm to 0.80 mm, and preferably from 0.15 mm to 0.45 mm. The steel filaments have a composition which is along the following lines: a carbon content ranging from 0.70 to 0.98%, a manganese content ranging from 0.10 to 1.10%, a silicon content ranging from 0.10 to 0.90%, sulphur and phosphorous contents being limited to 0.15%, preferably to 0.010%; additional elements such as chromium (up to 0.20–0.40%), copper (up to 0.20%), nickel (up to 0.30%), cobalt (up to 0.20%) and vanadium (up to 0.30%) may be added. The eventual tensile strength $R_m$ of the filaments depends upon its diameter: for example, a 0.2 mm normal tensile filament has a $R_m$ of above about 2800 Megapascal (MPa), a 0.2 mm high tensile filament has a $R_m$ of above about 3400 MPa, a 0.2 mm super high tensile filament has a $R_m$ of above about 3600 MPa and a 0.2 mm ultra high tensile filament has a $R_m$ of above about 4000 MPa. The steel filaments are coated with a layer that promotes the adhesion to the rubber; copper alloy coatings such as brass (either low—63.5% Cu—and high copper—67.5% Cu) or a complex brass coating (Ni+brass, brass+Co . . . ) are particularly suitable (these coatings can even be applied by means of plasma sputtering techniques).

We claim:

1. A steel cord comprising:
   a plurality of strength elements each twisted with a twist pitch into the cord, each of the strength elements having a projection in a plane perpendicular to a longitudinal central axis of the steel cord and taking the form of a two-dimensional curve throughout at least one twist pitch length thereof, as viewed into the longitudinal axis direction,
   wherein the curve of at least one of the strength elements is convex throughout the at least one twist pitch length, the convex curve having a radius of curvature varying between a maximum and a minimum so that micro-gaps are formed between the convexly curved strength element and the other strength elements adjacent thereto, the gaps being substantially smaller than the twist pitch and enabling rubber penetration.

2. A steel cord according to claim 1, wherein the distance between adjacent two minimum radii of curvature of the convex curve as measured along the longitudinal central axis is smaller than half the pitch thereof.

3. A steel cord according to claim 1, wherein the two-dimensional convex curve substantially resembles a polygons, as viewed into the longitudinal axis direction along at least one twist pitch length thereof.

4. A steel cord according to claim 1, wherein each of the strength elements is a strand consisting of a plurality of steel filaments.

5. A steel cord according to claim 1, wherein the strength elements are steel filaments.

6. A steel cord according to claim 5, wherein the steel cord has three to five steel filaments.

7. A steel cord according to claim 6, wherein each of the steel filaments has a part load elongation (PLE), at a tensile tension of 50 Newton, differing no more than 0.20% from the PLE of each of the other steel filaments.

8. A steel cord according to claim 6, wherein the steel cord has a part load elongation (PLE) lower than 0.30% at a tensile tension of 50 Newton.

9. A steel cord according to claim 5, wherein the steel cord has more than five steel filaments.

10. A steel cord according to claim 9, wherein the steel filaments all have the same twist pitch and direction.

11. A steel cord according to claim 10, wherein a combination of any three neighboring steel filaments that are adjacent to each other includes at least one steel filament having the convex curve.

12. A steel cord according to claim 5, wherein the steel cord includes only one steel filament having the convex curve.

13. A steel cord according to claim 1, further including at least one strength element having a twist pitch of an infinite value.

14. A steel cord according to claim 1, wherein the strength elements each have the convex curve.

15. A steel cord according to claim 1, wherein the distance between adjacent two minimum radii of curvature of the convex curve as measured along the longitudinal central axis is different from half the twist pitch length thereof.

16. A steel cord comprising:
    a plurality of first strength elements;
    at least one second strength element, the first and second strength elements each being twisted with a twist pitch into the cord, each of the first and second strength elements having a projection in a plane perpendicular to a longitudinal central axis of the steel cord and taking the form of a two-dimensional curve throughout at least one twist ditch length thereof, as viewed into the longitudinal axis direction,
    wherein the curve of at least the second strength element is convex throughout the at least one twist pitch length, with a radius of curvature thereof varying between a maximum and a minimum so that micro-gaps are formed between the second strength element and the first strength elements adjacent thereto, the micro-gaps being substantially smaller than the twist pitch and enabling rubber penetration.

17. A steel cord according to claim 16, wherein the curve of each of the first strength elements also is convex throughout the at least one twist pitch length thereof, with a radius of curvature thereof varying between a maximum and a minimum so that micro-gaps are formed between the strength elements.

18. A steel cord comprising:
    a plurality of first strength elements;
    at least one second strength element, the first and second strength elements each being twisted with a twist pitch into the cord, each of the first and second strength elements having a projection in a plane perpendicular to a longitudinal central axis of the steel cord and taking the form of a two-dimensional curve throughout at least one twist pitch length thereof, as viewed into the longitudinal axis direction,
    wherein the curve of at least the second strength element is substantially polygonal and convex throughout the at least one twist pitch length, the substantially polygonal and convex curve having a radius of curvature varying between a maximum and a minimum so that micro-gaps are formed between the second strength element and the first strength elements adjacent thereto, the micro-gaps being substantially smaller than the twist pitch and enabling rubber penetration,
    wherein each combination of any three neighboring strength elements that are adjacent to each other includes at least one second strength element having the substantially polygonal and convex curve.

19. A steel cord according to claim 18, wherein the curve of each of the first strength elements also is substantially polygonal and convex throughout the at least one twist pitch length thereof, each of the substantially polygonal and convex curve having a radius of curvature thereof varying between a maximum and a minimum so that micro-gaps are formed between the strength elements.

20. A steel cord comprising:
    a plurality of filaments, wherein more than half of the filaments are steel, each of the filaments being twisted with a twist pitch to form the cord, each of the filaments having a generally spiral twist, which forms a plurality of projections formed perpendicularly along a longitudinal central axis of the steel cord, the projections of each filament forming a curve throughout at least one twist pitch length thereof, as viewed into the longitudinal axis direction,
    wherein the curve of at least one of the filaments is convex throughout the at least one twist pitch length thereof, with a radius of the curvature thereof varying between a maximum and a minimum taken perpendicularly from the longitudinal axis of the cord so that micro-gaps are formed between the convexly curved filament and other filaments adjacent thereto, the micro-gaps being adapted to allow rubber penetration.

* * * * *